United States Patent
Chang et al.

(10) Patent No.: US 12,363,794 B2
(45) Date of Patent: Jul. 15, 2025

(54) PC5 RADIO RESOURCE CONTROL (RRC) SIDELINK (SL) CONNECTION MANAGEMENT

(71) Applicant: Kyocera Corporation, Kyoto (JP)

(72) Inventors: Henry Chang, San Diego, CA (US); Masato Fujishiro, Yokohama (JP)

(73) Assignee: Kyocera Corporation, Kyoto (JP)

( * ) Notice: Subject to any disclaimer, the term of this patent is extended or adjusted under 35 U.S.C. 154(b) by 317 days.

(21) Appl. No.: 17/913,269

(22) PCT Filed: Apr. 1, 2021

(86) PCT No.: PCT/US2021/025321
§ 371 (c)(1),
(2) Date: Sep. 21, 2022

(87) PCT Pub. No.: WO2021/206988
PCT Pub. Date: Oct. 14, 2021

(65) Prior Publication Data
US 2023/0380007 A1     Nov. 23, 2023

Related U.S. Application Data

(60) Provisional application No. 63/007,799, filed on Apr. 9, 2020.

(51) Int. Cl.
*H04W 76/30* (2018.01)
*H04W 36/00* (2009.01)
*H04W 76/25* (2018.01)
*H04W 92/18* (2009.01)

(52) U.S. Cl.
CPC ......... *H04W 76/30* (2018.02); *H04W 36/037* (2023.05); *H04W 76/25* (2018.02); *H04W 92/18* (2013.01)

(58) Field of Classification Search
CPC ... H04W 36/037; H04W 76/25; H04W 76/30; H04W 92/18
See application file for complete search history.

(56) References Cited

U.S. PATENT DOCUMENTS

| 6,563,839 | B1 | 5/2003 | Hallenstal et al. | |
| 2020/0413467 | A1* | 12/2020 | Pan | H04W 72/04 |
| 2022/0007447 | A1* | 1/2022 | Hong | H04W 76/18 |

OTHER PUBLICATIONS

LG Electronics, Samsung; "Clarification on unicast link release," S2-2000347; 3GPP TSG-SA WG2 Meeting #136AH; Jan. 7, 2020; Incheon, KR.
Huawei, Hisilicon; "Analysis on connection establishment procedure for SL unicast," R2-1904080; 3GPP TSG-RAN WG2 Meeting #105bis; Mar. 29, 2019; Xi'an, CN.
(Continued)

*Primary Examiner* — James P Duffy

(57) ABSTRACT

A peer user equipment (UE) device maintains an existing Sidelink Radio Bearer (SLRB) configuration to support a first PC5 Radio Resource Control (RRC) sidelink (SL) communication link with a source UE device. The peer UE device receives a request to establish a second PC5 RRC SL communication link with the source UE device and determines that the existing SLRB configuration is required to support the second PC5 RRC SL communication link. The peer UE device releases the first PC5 RRC SL communication link.

27 Claims, 6 Drawing Sheets

(56) References Cited

OTHER PUBLICATIONS

ZTE Corporatoin, Sanechips; "Discussion on QoS and SLRB configuration," R2-1909064; 3GPP TSG-RAN WG2 Meeting #107; Aug. 16, 2019; Prague, CZ.
Vivo (Rapporteur); "Report of [107#73] [NR/V2X] SDAP," R2-1912263; 3GPP RSG-RAN WG2 Meeting #107bis; Oct. 3, 2019; Chongqing, CN.

* cited by examiner

PC5 RADIO RESOURCE CONTROL (RRC) SIDELINK (SL) CONNECTION MANAGEMENT

CLAIM OF PRIORITY

The present application claims the benefit of priority to Provisional Application No. 63/007,799 entitled "RLF Handling Under Multiple PC5-RRC Connections", filed Apr. 9, 2020, assigned to the assignee hereof and hereby expressly incorporated by reference in its entirety.

CROSS REFERENCE TO RELATED APPLICATIONS

This application is related to the application entitled "PC5 RADIO RESOURCE CONTROL (RRC) SIDELINK (SL) CONNECTION MANAGEMENT WITH BASE STATION NOTIFICATION", U.S. application Ser. No. 17/913,300, which is a national stage application of PCT/US2021/125324, filed concurrently with this application and incorporated in its entirety herein.

FIELD

This invention generally relates to wireless communications and more particularly to PC5-RRC connection management for sidelink communication.

BACKGROUND

Many wireless communication systems that employ several base stations that provide wireless service to user equipment (UE) devices enable sidelink communication between two or more UE devices where the UE devices can communicate directly with other UE devices. Sidelink communication supports vehicle-to-everything (V2X) applications where UE devices in vehicles communicate with other UE devices that may be in vehicles along the roadside, with pedestrians, or any entity that may affect, or may be affected by, the vehicle.

At least some revisions of the 3rd Generation Partnership Project communication specifications specify a PC5 interface for sidelink communication. The PC5 interface makes use of Radio Resource Control (RRC) protocol similar to that used in Uu connection between a UE device and base station. Sidelink communications can use broadcast, groupcast or unicast for transmitting signals. Unicast sidelink communication, however, in some revisions of the 3GPP communication specifications support Radio Link Monitoring (RLM) and Radio Link Failure (RLF) triggering. As a result, UE devices communicating over a unicast PC5 RRC communication link are able to detect failure or degradation of the sidelink radio connection.

SUMMARY

A peer user equipment (UE) device maintains an existing Sidelink Radio Bearer (SLRB) configuration to support a first PC5 Radio Resource Control (RRC) sidelink (SL) communication link with a source UE device. The peer UE device receives a request to establish a second PC5 RRC SL communication link with the source UE device and determines that the existing SLRB configuration is required to support the second PC5 RRC SL communication link. The peer UE device releases the first PC5 RRC SL communication link.

DETAILED DESCRIPTION

Figure 1:
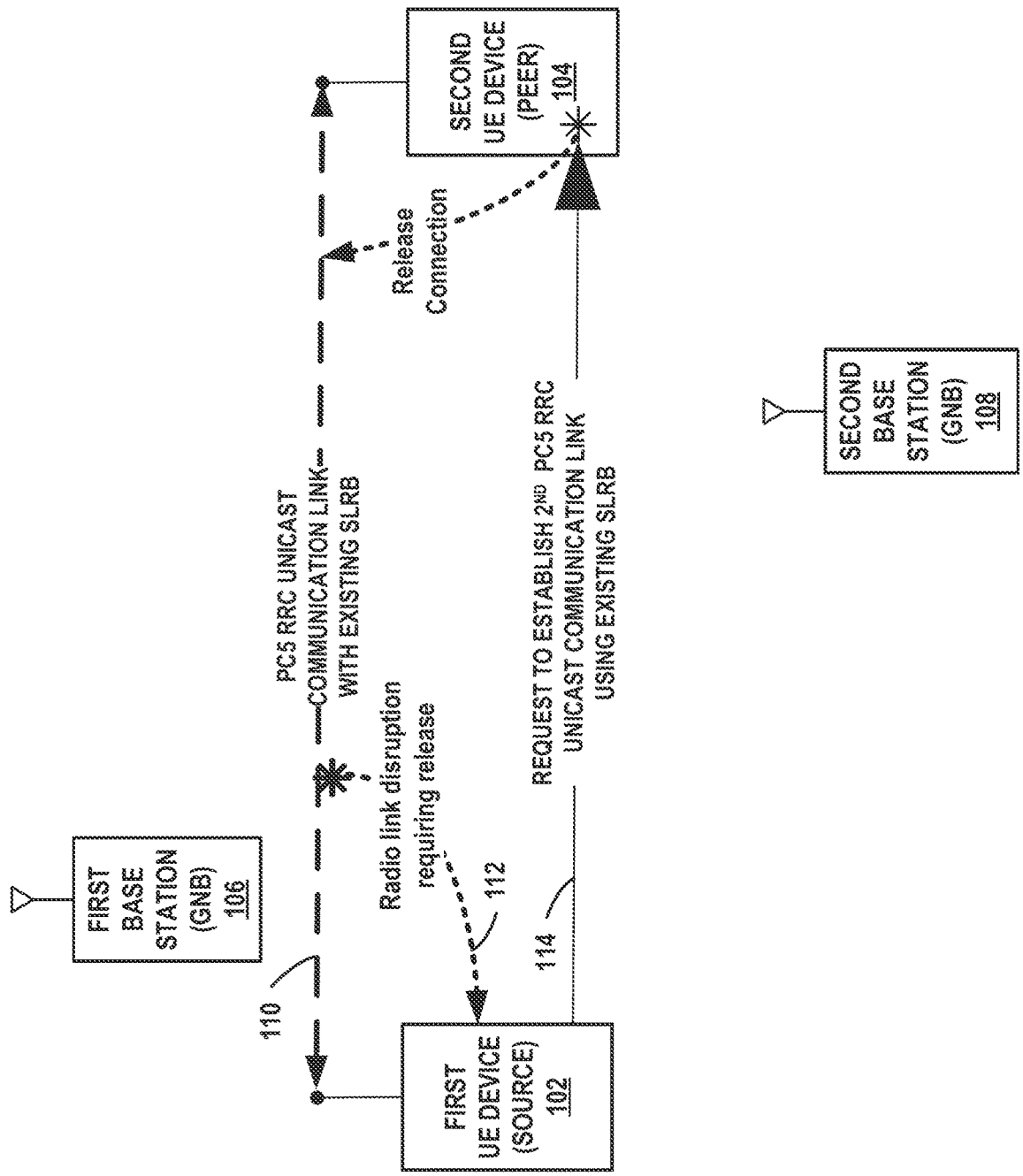
FIG. 1 is a block diagram of an example of a communication system including a first user equipment (UE) device and a second UE device, and two base stations.

As discussed above, in systems operating in accordance with one or more revisions of 3GPP communication specifications, sidelink unicast communications between two or more user equipment (UE) devices are performed over a PC5-RRC link that supports RLF and RLM triggering. Sidelink RLF and RLM differ from the traditional techniques used for Uu RLF and RLM since sidelink communication is half-duplex and prevents the transmission of periodic reference signals. With Uu communication, the UE device can rely on measurement of periodic reference signals sent by the base stations. Half-duplex communication of sidelink prevents the UE device from receiving sidelink while transmitting on sidelink. As a result, a first UE device is not able to receive sidelink transmissions from second UE device at the same time the first UE device is transmitting sidelink reference signals. Nonetheless PC5-RRC link communication supports RLF and RLM allowing for the detection of radio link degradation or failure. In some situations, however, one UE device of a pair may detect a radio link degradation or failure before the other. As a result, PC5 RRC connection management for sidelink communication is needed.

One advantage of detecting the poor or failed communication link and releasing the connection is that it prevents unnecessary interference to other devices in the area. Another advantage is that is allows the two UE devices to establish another link which, in some cases, may be a Uu link through the communication network using one or more base stations. Examples of techniques that allow the UE device to determine that the unicast PC5 RRC link is poor due to a radio or configuration problem and should be disconnected include monitoring the number of RLC retransmissions, the expiration of a timer such as T400, a V2X layer instruction to the AS layer to release the connection, and hybrid automatic repeat request (HARQ)-based SL-RLF. The V2X layer instruction may be based on a keep-alive messaging where messages are periodically, or at least occasionally, sent from the other UE device to indicate that the connection is still active. In accordance with at several revisions of communication specifications, the T400 timer is used to determine whether the sidelink configuration from the source UE device to the peer UE device is or is not successful. The timer is started upon transmission of RRCReconfigurationSidelink by the source UE device. The timer is stopped upon reception of RRCReconfiguration- FailureSidelink or RRCReconfigurationCompleteSidelink sent by the peer UE device. When neither of the above two messages is received before the timer expiry, the source UE device will declare SL-RLF and inform the upper layer of the UE device. In RLC-AM (Acknowledged mode), the peer UE device receiving a data transmission is required to send an RLC ACK or NACK (similar to HARQ feedback but at the L2 level rather than physical channel level). If a RLC NACK is received, then the source UE device will retransmit the RLC packet to the peer UE device. This can be repeated up to N times, where N is the configurable max number of RLC retransmissions, before the source UE device declares SL-RLF. These methods for releasing the PC5 RRC links are also associated with mechanisms for link management with different degrees of urgency. The HARQ-based mechanism typically provides the quickest approach to determining when the sidelink fails where the AS layer of the transmitting UE device may inform the upper layer of the link failure. The keep-alive functionality, on the other hand, is generally considered as the mechanism with the least urgency in determining when the unicast link may no longer function properly since the UE device is not expected to request keep-alive message response from its peer UE device more frequently than HARQ feedback messaging. Additionally, even when a particular mechanism is selected, whether it is HARQ-based, keep-alive messaging based, or RLC retransmission based, the effectiveness of the link management can be fine-tuned by configuring the number of consecutive DTX triggering RLF for HARQ-based, the periodicity of keep-alive messaging and the maximum RLC retransmissions. The implemented method and quantity used for link management may be configured or pre-configured by the network which may be dependent on the desired QoS for the intended V2X service(s) for the established PC5-RRC link. For conventional and currently proposed systems, however, there is a need for PC5-RRC connection management for systems with single PC5-RRC connections between two UE devices as well as for systems utilizing multiple PC5-RRC connections between the two UE devices.

In some situations, a single unicast PC5 RRC connection between two UE devices supports multiple V2X layer links between the two UE devices. In these situations, PC5 RRC connection management for sidelink communication is needed since one of the UE devices may detect link disruption before the other because different link management is being used at each UE device or the communication is not symmetrical (e.g., one UE device is transmitting much more frequently than the other). A mechanism is required to determine how and when a connection between the two UE devices is reestablished.

In other situations, each V2X unicast link is implemented on a different PC5 RRC connection. Where multiple PC5 RRC links are used between two UE devices, other scenarios may occur requiring PC5 RRC connection management. More specifically, in systems having multiple PC5 RRC links between two UE devices, link management applied to each of the multiple PC5-RRC connections may be configured independently. Depending on link management configurations for the each of the PC5-RRC connections, the triggering mechanism for declaring sidelink RLF (SL-RLF) and for the corresponding release of PC5-RRC connection may differ. In many cases, when a source UE and a peer UE move out of reach of one another, regardless of which link management mechanism is used for the two connections, SL-RLF will be triggered, although at different times. In some situations, the time difference between the two triggering events may be significant. For example, if the first PC5-RRC connection is configured with a small number of consecutive HARQ DTX, a SL-RLF failure may be quickly triggered if there is a momentary disconnect between the UE devices. If the second PC5-RRC connection uses keep-alive messaging with a long period, a release of the second connection may not occur until much later. Depending on the link management configurations and operation, however, a particular link management technique may not always result in a quicker release than another. If the number of consecutive HARQ DTX are configured with a larger value, for example, the SL-RLF based on HARQ may not be declared before the keep-alive messaging trigger. Therefore, the fact that the first PC5-RRC connection has failed does not necessary imply the peer UE is not reachable by the source UE. This may especially be true for the case when the second PC5-RRC connection does not fail even after a prolonged duration. In typical situations for contemplated systems, a UE device will report a SL-RLF to an upper layer protocol when each of multiple PC5-RRC connections experiences a SL-RLF. Depending on the particular UE device implementation, the upper layer of the source UE device may initiate a new PC5-RRC connection towards the same peer UE device if the second PC5-RRC connection to the peer UE device is still ongoing (SL-RLF did not occur for the second connection).

In some situations where multiple PC5-RRC connections are used between two UE devices, it is possible for the source UE device to retain the associated SL UE context after releasing the connection. When reestablish the released connection, the source UE device may skip sending the UECapabilityEnquirySidelink and initiate the new PC5-RRC with SLRB configuration information within RRCReconfigurationSidelink. When the source UE device decides to initiate a new PC5-RRC connection, the source UE device sends a SLRB configuration to the peer UE, but the peer UE may not have released the previously established PC5-RRC connection for the same V2X service. For example, depending on the configured link management from the gNB of the peer UE device, it may not be possible to adopt a release procedure to inform the peer of its SL-RLF condition. As a result, the peer UE device and its serving gNB are not aware that the new PC5-RRC connection establishment corresponds to SLRB configuration of the existing PC5-RRC connection that has yet to fail. For proposed systems, there is no time alignment between when the source UE device and the peer UE device releases the mutual PC5-RRC connection due to SL-RLF. There are no proposed mechanisms for how the peer UE device would behave when there is a request to establish a PC5-RRC connections for the same V2X service. Therefore, systems where two UE device utilize multiple PC5-RRC unicast connections present additional needs for a PC5-RRC management technique.

FIG. 1 is a block diagram of an example of a communication system 100 including a first user equipment (UE) device 102 and a second UE device 104, and two base stations 106, 108. Although the techniques discussed herein may be applied to various types of systems and communication specifications, the devices of the example operate in accordance with at least one revision of a 3GPP New Radio (NR) V2X or LTE V2X communication specification. The techniques discussed herein, therefore, may be adopted by one or more communication specifications although the techniques may be applied to other communication specifications where sidelink or D2D is employed. More specifically the techniques may be applied to current and future releases of 3GPP LTE and NR specifications. For example, the techniques may also be applied to 3GPP NR (Rel-17). For the example, the UE devices 102, 104 may be any type of device that can receive signals from, and transmit signals to, base stations and other UE devices. The UE devices operate in the communication system that includes a plurality of base stations that each provide wireless service within a service area. For the example of FIG. 1, the UE devices 102, 104 are served by either a first base station 106 or a second base station 108 and may transition between base stations in accordance with known handover techniques. Each of UE devices 102, 104, therefore, may be served by a different base station even though the UE devices 102, 104 are communicating with each other using a unicast sidelink connection.

For the example, the first UE device 102 is a source UE device and the second UE device 104 is a peer UE device where the two UE devices are communicating over a unicast PC5 RRC communication link 110. The sidelink radio bearer (SLRB) configuration of the unicast RRC-PC5 communication link 110 is referred to as an existing SLRB configuration for purposes of clarifying that the SLRB configuration was in use before other events in the example. For the systems discussed herein, unicast connections support Radio Link Monitoring (RLM) and Radio Link Failure (RLF) triggering. RLM and RLF allow a controlling entity, such as a source UE device, to determine whether a connection is still good. If the connection is poor or failed, the controlling entity may take action to quickly disconnect the unicast link. One advantage of detecting the poor or failed communication link and releasing the connection is that it prevents unnecessary interference to other devices in the area. Another advantage is that is allows the two UE devices to establish another link which, in some cases, may be a Uu link through the communication network using one or more base stations. Examples of techniques that allow the UE device to determine that the unicast PC5 RRC link is poor due to a radio or configuration problem and should be disconnected include monitoring the number of RLC retransmissions, the expiration of a timer such as T400, a V2X layer instruction to the AS layer to release the connection, and HARQ-based SL-RLF. The V2X layer instruction may be based on a keep-alive messaging where messages are periodically, or at least occasionally, sent from the other UE device to indicate that the connection is still active. These methods for releasing the PC5 RRC links are also associated with mechanisms for link management with different degrees of urgency. The HARQ-based mechanism typically provides the quickest approach to determining when the sidelink fails where the AS layer of the transmitting UE device may inform the upper layer of the link failure. The keep-alive functionality, on the other hand, is generally considered as the mechanism with the least urgency in determining when the unicast link may no longer function properly since the UE device is not expected to request keep-alive message response from its peer UE device more frequently than HARQ feedback messaging. Additionally, even when a particular mechanism is selected, whether it is HARQ-based, keep-alive messaging based, or RLC retransmission based, the effectiveness of the link management can be fine-tuned by configuring the number of consecutive DTX triggering RLF for HARQ-based, the periodicity of keep-alive messaging and the maximum RLC retransmissions. The implemented method and quantity used for link management may be configured or pre-configured by the network which may be dependent on the desired QoS for the intended V2X service(s) for the established PC5-RRC link.

During the unicast sidelink communication of the example of FIG. 1, the source UE device 102 detects, or otherwise is made aware of, a radio link disruption 112 that requires the source UE device to release the PC5 RRC unicast connection. The detection of the radio link disruption or determination to release the PC5 RRC unicast connection may be based on any of the examples discussed above as well as combination and other techniques. Therefore, the detection of a radio link disruption is any determination of a poor or failed link where typical examples include RLF indicators or RLM indicators indicating a poor link. After releasing the connection 110, the source UE device 102 initiates a procedure to reestablish the connection with the peer UE device 104 by sending a request to establish a second PC5 RRC unicast communication link. In some examples, the request 114 is formatted and transmitted in accordance with the same formatting and transmission as a Direct Communication Request message used to establish a new unicast RRC PC5 connection. Since the request 114 is intended to reestablish the PC5 RRC link 110 that was released by the source UE device 102, the request 114 identifies the existing SLRB configuration used for the PC5 RRC unicast communication link 110. The peer UE device 104 receives the request 114 and determines that the existing SLRB configuration is identified by the request 114. Since the peer UE device 104 may not have any indication that PC5 RRC link 110 was poor and that it was released by the source UE device 102, the request 114 may provide the first indication to the peer UE device that the PC5 RRC link 110 was released. For the examples herein, the peer UE device identifies the SLRB in the request as the existing SLRB for the PC5 RRC link 110. In some situations, the peer UE device 104 determines that the existing configuration is based on a source layer 2 identifier (L2ID) and a SL logical channel identifier (LCID) identified by the request to determine that the SLRB configuration identified in the request 114 is the existing SLRB configuration of the PC5 RRC link 110.

In one example, the peer UE device immediately releases the PC5 RRC link in response to the request 114 and attempts to establish the second link specified by the request 114. In another example, the peer UE device 104 notifies the serving base station that the request has been received and does not attempt to establish the requested link and does not release the PC5 RRC link 110 until instructed by the serving base station. In some situations, the request 114 may include information related to the existing PC5 RRC link 110. For example, information in the MAC header of the Direct Communication Request message may include an additional reestablishment indicator indicating that the request 114 is to reestablish the PC5 RRC link 110. The information may also indicate that the previous PC5 RRC link 110 has been released, suffered an RLF (or other disruption) or any other information or combination of indicators that provide information related to the previous link 110.

Figure 2:
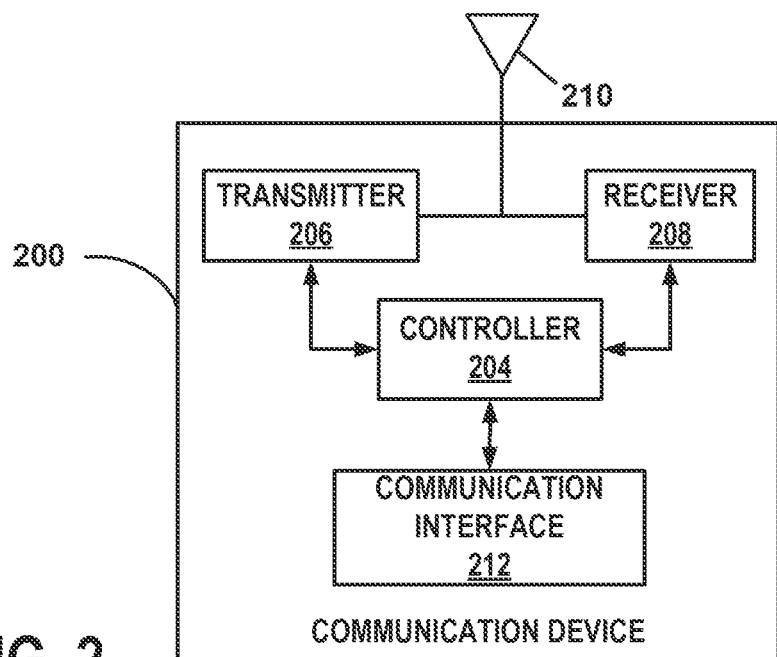
FIG. 2 is a block diagram of an example of a base station suitable for use as each of the base stations.

FIG. 2 is a block diagram of an example of a base station 200 suitable for use as each of the base stations 106, 108. The base station 200 includes a controller 204, transmitter 206, and receiver 208, as well as other electronics, hardware, and code. The base station 200 is any fixed, mobile, or portable equipment that performs the functions described herein. The various functions and operations of the blocks described with reference to the base stations 102, 104 may be implemented in any number of devices, circuits, or elements. Two or more of the functional blocks may be integrated in a single device, and the functions described as performed in any single device may be implemented over several devices. The base station 200 may be a fixed device or apparatus that is installed at a particular location at the time of system deployment. Examples of such equipment include fixed base stations or fixed transceiver stations. Although the base station may be referred to by different terms, the base station is typically referred to as a gNodeB or gNB when operating in accordance with one or more communication specifications of the 3GPP V2X operation. In some situations, the base station 200 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 200 may be a portable device that is not fixed to any particular location.

The controller 204 includes any combination of hardware, software, and/or firmware for executing the functions described herein as well as facilitating the overall functionality of the base station 200. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2 perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the signals to be transmitted as part of the downlink signals and can apply any one of a plurality of modulation orders. The demodulator demodulates any uplink signals received at the base station 200 in accordance with one of a plurality of modulation orders.

The base station 200 includes a communication interface 212 for transmitting and receiving messages with other base stations. The communication interface 212 may be connected to a backhaul or network enabling communication with other base stations. In some situations, the link between base stations may include at least some wireless portions. The communication interface 212, therefore, may include wireless communication functionality and may utilize some of the components of the transmitter 206 and/or receiver 208.

Figure 3:
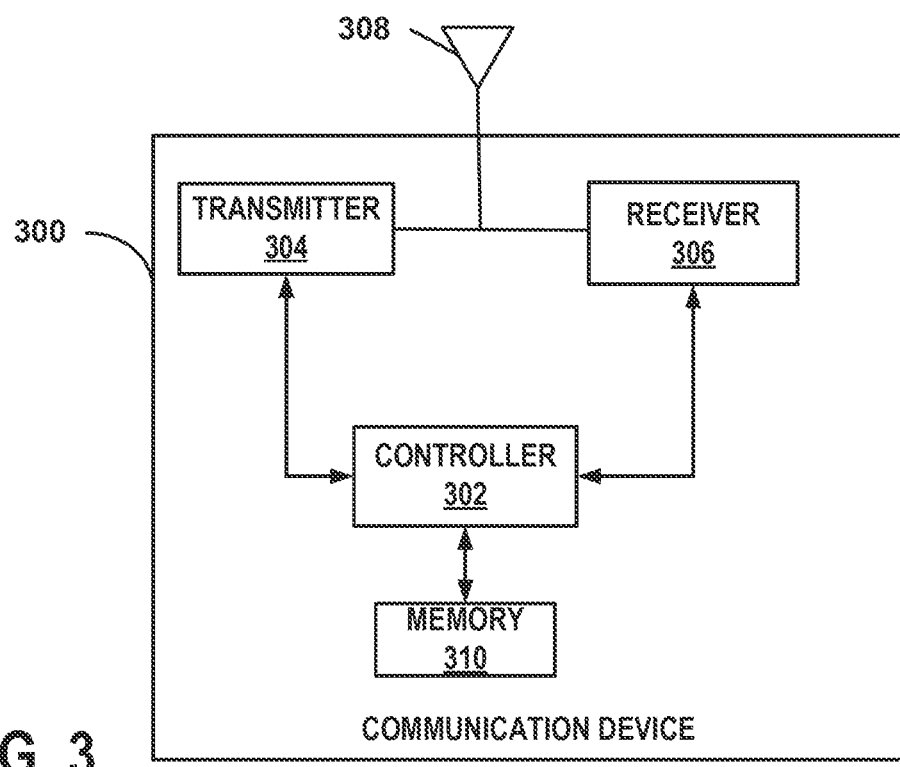
FIG. 3 is a block diagram of an example of a UE device suitable for use as each of the UE devices.

FIG. 3 is a block diagram of an example of a UE device 300 suitable for use as each of the UE devices 102, 104. In some examples, the UE device 300 is any wireless communication device such as a mobile phone, a transceiver modem, a personal digital assistant (PDA), a tablet, or a smartphone. In other examples, the UE device 300 is a machine type communication (MTC) communication device or Internet-of-Things (IOT) device. The UE device 300, therefore is any fixed, mobile, or portable equipment that performs the functions described herein. The various functions and operations of the blocks described with reference to UE device 300 may be implemented in any number of devices, circuits, or elements. Two or more of the functional blocks may be integrated in a single device, and the functions described as performed in any single device may be implemented over several devices.

The UE device 300 includes at least a controller 302, a transmitter 304 and a receiver 306. The controller 302 includes any combination of hardware, software, and/or firmware for executing the functions described herein as well as facilitating the overall functionality of a communication device. An example of a suitable controller 302 includes code running on a microprocessor or processor arrangement connected to memory. The transmitter 304 includes electronics configured to transmit wireless signals. In some situations, the transmitter 304 may include multiple transmitters. The receiver 306 includes electronics configured to receive wireless signals. In some situations, the receiver 306 may include multiple receivers. The receiver 304 and transmitter 306 receive and transmit signals, respectively, through antenna 308. The antenna 308 may include separate transmit and receive antennas. In some circumstances, the antenna 308 may include multiple transmit and receive antennas.

The transmitter 304 and receiver 306 in the example of FIG. 3 perform radio frequency (RF) processing including modulation and demodulation. The receiver 304, therefore, may include components such as low noise amplifiers (LNAs) and filters. The transmitter 306 may include filters and amplifiers. Other components may include isolators, matching circuits, and other RF components. These components in combination or cooperation with other components perform the communication device functions. The required components may depend on the particular functionality required by the communication device.

The transmitter 306 includes a modulator (not shown), and the receiver 304 includes a demodulator (not shown). The modulator can apply any one of a plurality of modulation orders to modulate the signals to be transmitted as part of the uplink signals. The demodulator demodulates the downlink signals in accordance with one of a plurality of modulation orders.

Figure 4:
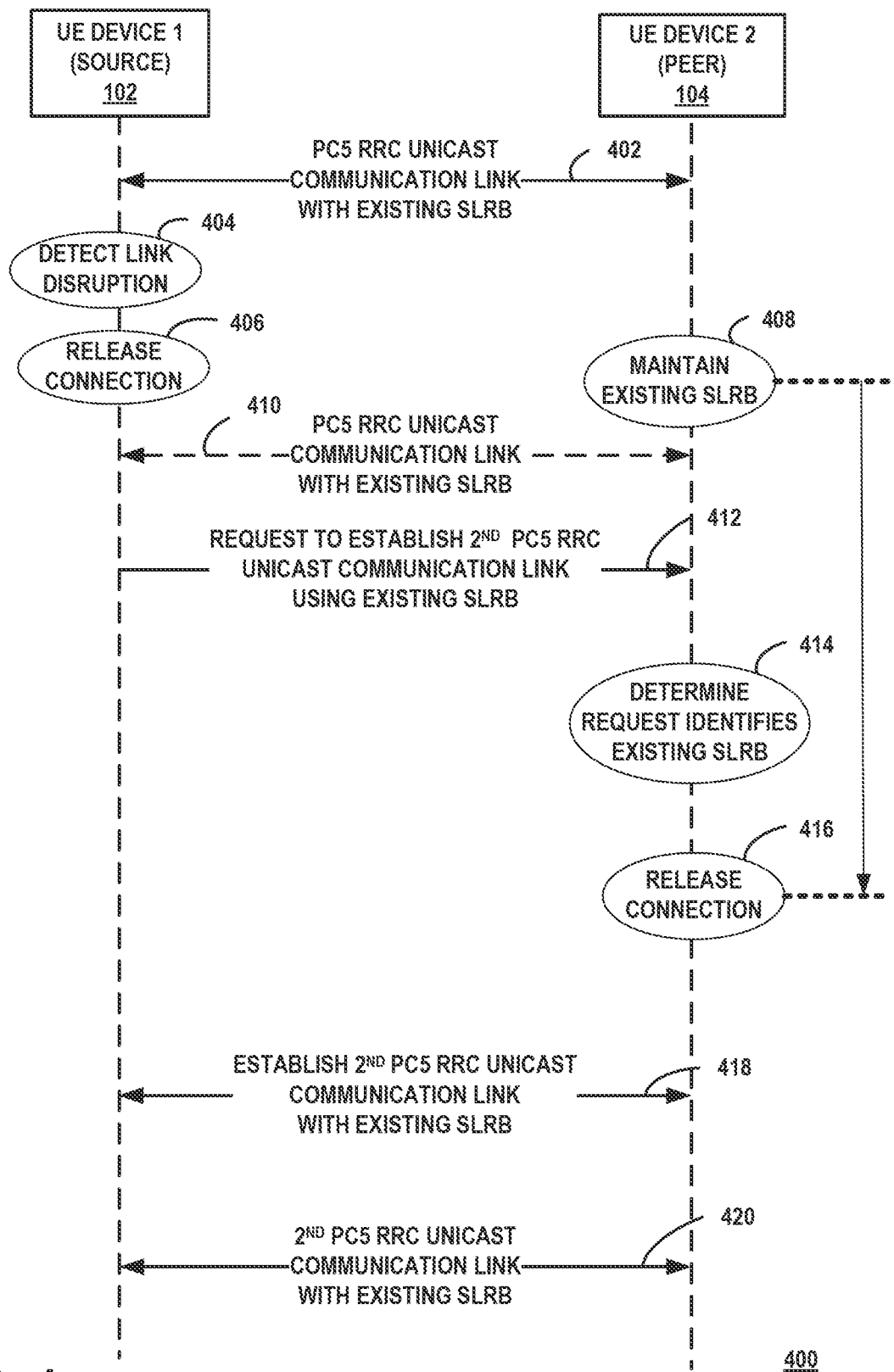
FIG. 4 is a messaging diagram for an example of reestablishing a PC5 RRC unicast connection.

FIG. 4 is a messaging diagram 400 for an example of reestablishing a PC5 RRC unicast connection. The example begins at 402 with the first UE device 102 in communication with the second UE device 104 over a PC5 RRC unicast communication connection 110. The connection 110 may support any number of V2X services in accordance with known techniques.

At event 404, the first UE device 102 detects a link disruption of the PC5 RRC unicast communication connection. The detection of a link disruption may be any indication that the link has failed or the connection is poor. Accordingly, the link disruption detection may be an indication that the link cannot support the QoS of the V2X service for which the link is being used. In some situations, the detection is based on HARQ-based SL-RLF. In accordance with known techniques, the first UE device monitors HARQ acknowledgement (ACK) and negative ACK (NACK) messages from the second UE device 104 to determine if a SL RLF has occurred. In some other situations the first UE device 102 monitors RLC retransmissions to determine if a link disruption has occurred. In still other situations, the detection of a link disruption may be based on a timer. Other techniques for detection of link disruption may be based on keep-alive messaging. With keep alive messaging techniques, an instruction to release the connection sent from the V2X layer to the AS layer may provide the indication that the link is disrupted.

At event 406, the first UE device 102 releases the PC5 RRC unicast connection 110. In the example, however, the second UE device 104 is unaware that the first UE device 102 had released the connection 110, or that the connection has suffered an RLF or decrease in quality. As a result, the second UE device 104 maintains the SLRB configuration for the connection 110 at event 408. The PC5 RRC communication link 110 is shown as communication 410 in FIG. 4 to indicate that the first UE device has released the connection but the second UE device has not yet released the connection and is unaware of any link disruptions At transmission 412, the first UE device sends a request to establish a second PC5 RRC unicast communication link. The request identifies the existing SLRB configuration that was used for the communication 402 over the PC5 RRC unicast communication link 110. The request is a Direct Communication Request message transmitted in accordance with at least one revision of a 3GPP communication specification. In some situations, the request is a Direct Communication Request message that includes information in the MAC header where the information may include an additional reestablishment indicator indicating that the request is to reestablish the PC5 RRC link 110. The information may also indicate that the previous PC5 RRC link 110 has been released, suffered an RLF (or other disruption) or any other information or combination of indicators that provide information related to the previous link 110.

At event 414, the second UE device determines that the request identifies the existing SLRB configuration used for the PC5 RRC communication 402. The second UE device determines that request is to reestablish the PC5 RRC communication link since the SLRB configuration in the request is the same as the existing SLRB configuration of the PC5 RRC link 110. For the example, the second UE device 104 releases the previous PC5 RRC connection 110 at event 416 in response to the request.

At communication 418, the second UE device and the first UE device exchange message to establish the second PC5 RRC unicast connection. In accordance with known techniques, the second UE also communicates with its serving base station (gNB) to establish the sidelink unicast connection with the first UE device. For example, the second UE device 110 sends an RRC Request message (SidelinkUEInfromation message) over the Uu link to its serving cell in response to the request.

At communication 420, the first UE device 102 and the second UE device 104 communicate over the second PC5 RRC communication link. Accordingly, the original PC5 RRC communication link 110 is reestablished with the second unicast PC5 RRC communication link.

Figure 5:
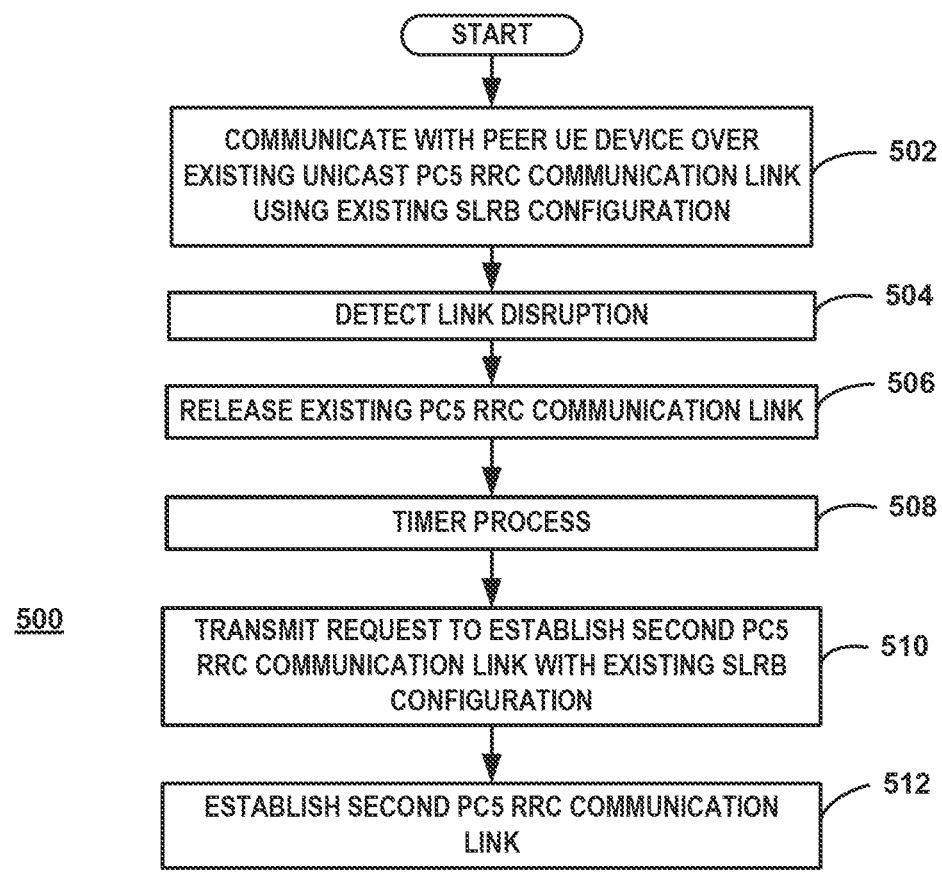
FIG. 5 is a flow chart of an example of a method of managing PC5 RRC connections by a UE device detecting a radio link disruption.

FIG. 5 is a flow chart of an example of a method 500 of managing PC5 RRC connections by a UE device detecting a radio link disruption. For the example, the method is performed by a UE device operating in a NR V2X or LTE C-V2X system such as the system 100 described above. Accordingly, the method may be performed by the first UE device 102. Other steps may be performed as part of the method and some steps may be omitted. For example, step 508 is omitted in some circumstances.

At step 502, the UE device communicates with a second UE device 104 over an existing unicast PC5 RRC communication link 110 using an existing SLRB configuration.

At step 504, a link disruption of the existing unicast PC5 RRC communication link 110 is detected. As discussed above, the link disruption may be detected based on RLF, RLM, keep-alive messaging, a T400 timer, or combinations of indicators.

At step 506, the existing unicast PC5 RRC communication link 110 is released.

At step 508, a delay process is performed. The delay allows time for the second UE device 104 to detect that the existing unicast PC5 RRC communication link 110 has suffered a RLF or is providing a poor connection. The delay process is omitted in some situations. An example of a suitable delay process is discussed below with reference to FIG. 6.

At step 510, a request to establish a second unicast PC5 RRC communication link is transmitted to second UE device 104 where the second unicast PC5 RRC communication link has the existing SLRB configuration. The first UE device 102, therefore, attempts to reestablish the original PC5 link 110 by requesting a second PC5 link having the same SLRB configuration. For the examples herein, the request is a Direct Communication Request message. In some situations, the request may provide information regarding the release of the first unicast PC5 RRC link communication 110. An indicator in the MAC header in the Direct Communication Request message, for example, may indicate that the request is to reestablish the first unicast PC5 RRC link communication 110.

At step 512, the second unicast PC5 RRC communication link is establish to reestablish the original PC5 RRC link 110. The first UE device exchanges messages with the second UE device 104 and a gNB, if needed, to establish the second unicast PC5 RRC connection in accordance with known techniques.

Figure 6:
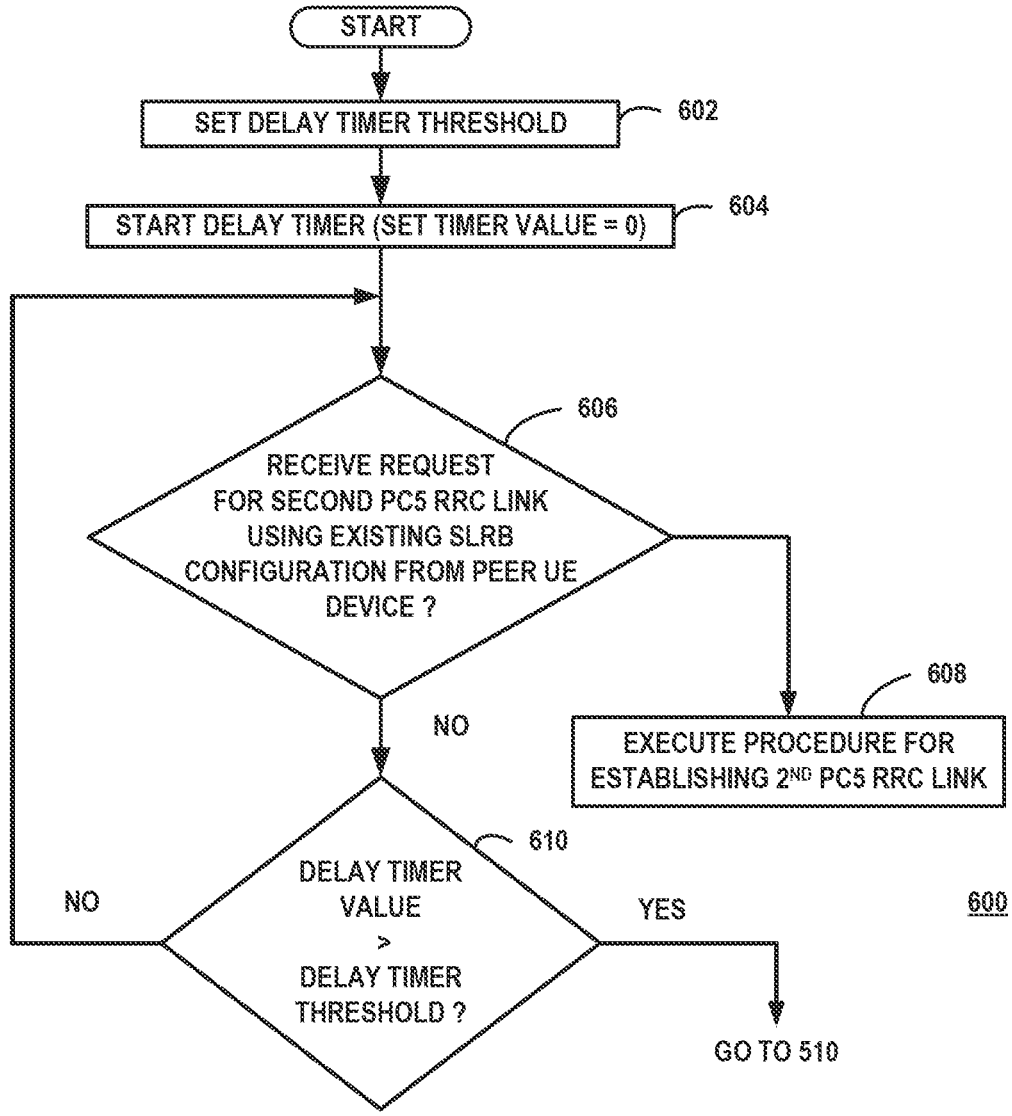
FIG. 6 is a flow chart of an example of a method of performing the delay process of the example of FIG. 5.

FIG. 6 is a flow chart of an example of a method of performing the delay process of step 508 of the example of FIG. 5. All of the steps of the example of FIG. 6 are not necessary performed between steps 506 and 510 of the method of FIG. 5. In some situations, for example, step 602 may be performed when the first PC5 RRC communication link 110 is established and while the first UE device 102 is communicating over the first PC5 RRC communication link 110.

At step 602, the delay timer threshold is set. The threshold value is determined by analysis, preconfigured information, and/or coordination with other UE devices. In one example, the delay timer threshold is determined by observing the frequency of the keep-alive messaging transmitted by the second UE device 104. The periods between the receipt of keep-alive messages are logged and the delay timer threshold is based on the logged data. For example, the threshold may be the longest period between messages or the longest period between messages plus a buffer delay. In another example, the second UE device 104 and the first UE device 102 exchange messages to set the threshold value. For example, the second UE device 104 may send the threshold value to the first UE device when the first PC5 RRC communication link 110 is established.

At step 604, the delay timer is reset. The timer value is set to zero.

At step 606, it is determined whether a request for a second unicast PC5 RRC link has been received from the second UE device 104 where the request identifies the existing SLRB configuration. If a request has been received, the method proceeds to step 608 where the procedure for establishing the second unicast PC5 RRC link is executed. Otherwise, the method continues at step 610.

At step 610, it is determined whether the delay timer has expired. If the delay timer has not expired, the method returns to step 606. If the delay timer has expired, the method continues at step 510 of the example of FIG. 5.

Figure 7:
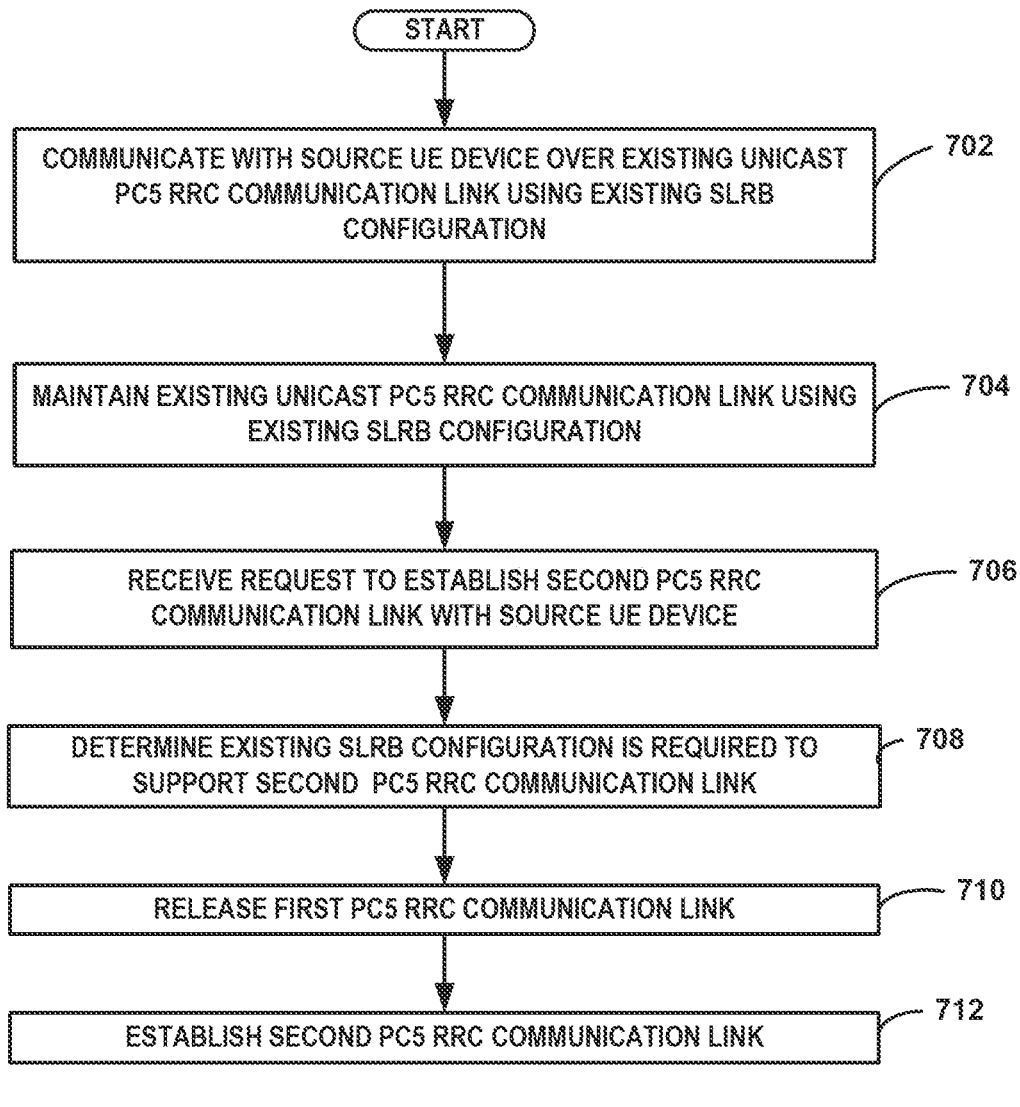
FIG. 7 is a flow chart of an example of a method of managing PC5 RRC connections by a UE device that has not yet detected a radio link disruption.

FIG. 7 is a flow chart of an example of a method 700 of managing PC5 RRC connections by a UE device that has not yet detected a radio link disruption. For the example, the method is performed by a UE device operating in a NR V2X or LTE C-V2X system such as the system 100 described above. Accordingly, the method may be performed by the second UE device 104.

At step 702, the UE device communicates with another UE device 102 over an existing unicast PC5 RRC communication link 110 using an existing SLRB configuration.

At step 704, the existing unicast PC5 RRC communication link 110 using the existing SLRB configuration is maintained. Although the link 110 may have failed or has degraded to a point that it is not sufficient for the application communication, the second UE device 104 may not be aware of the change in status. In some situations, the second UE device may not have received any HARQ feedback messaging but is not expecting to receive any HARQ messages because messages sent to the first UE device did not require HARQ feedback. In some situations, keep-alive messaging may not be available from the first UE device 102 or the period between keep alive messages may be long. In other words, the second UE device may be sending keep-alive messages more frequently than the first UE device 102 or the first UE device 102 may not be sending any keep alive messages. As a result, the first UE device may detect the radio link degradation or failure before the second UE device. The second UE device 104, therefore, maintains the unicast PC5 RRC communication link 110 and maintains the existing SLRB configuration that supports the unicast PC5 RRC communication link 110.

At step 706, a request for a second unicast PC5 RRC communication link is received from the first UE device 102 where the request identifies the existing SLRB configuration. For the example, the second UE device 104 receives a Direct Communication Request message. In some situations, as discussed above, the request may include information related to the existing PC5 RRC communication link 110. For example, a MAC header in the Direct Communication Request message may include an indicator that the PC5 RRC link 110 has been released by the first UE device 102 or that the current request is to reestablish the PC5 RRC communication link 110.

At step 708, it is determined a request for a second unicast PC5 RRC communication link is received from the first UE device 102 where the request identifies the existing SLRB configuration. In one example, the second UE device 104 evaluates the source layer 2 identifier (L2ID) and a SL logical channel identifier (LCID) identified by the request and determines that these values are the same as the existing SLRB configuration to determine that the SLRB configuration of the request is the existing SLRB configuration. Since multiple unicast connections may be supported by the same PC5 RRC communication link, more than one SLRB configuration may be maintained at the UE device. As a result, if the SLRB configuration of the request matches any of the existing SLRB configurations, the UE device 104 determines that an existing SLRB configuration is required to support the second unicast PC5 RRC communication link.

At step 710, the first PC5 RRC communication link 110 is released. In accordance with known techniques, the UE device 104 autonomously releases the first PC5 RRC link and informs the upper layer of the release. When in coverage of a gNB and in the connected mode, the UE device may inform its serving gNB. In some implementations, the system 100 may support multiple PC5 RRC communication links between two UE devices. In such situations, the UE device 104 releases the PC5 RRC communication link that is supported by the SLRB configuration identified in the request.

At step 712, the second unicast PC5 RRC communication link is established. In accordance with known techniques, the second UE device 104 communicates with the first UE device 102 and the serving gNB (base station) to establish the second link and thereby, reestablish the previous first link 110.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method performed at a peer user equipment (UE) device comprising:
    maintaining a first unicast PC5 Radio Resource Control (RRC) communication link with a source UE device, the first unicast PC5 RRC communication link having an existing Sidelink Radio Bearer (SLRB) configuration;
    receiving a request to establish a second unicast PC5 RRC communication link with the source UE device;
    determining the existing SLRB configuration is required to support the second unicast PC5 RRC communication link; and
    releasing the first unicast PC5 RRC communication link.

2. The method of claim 1, wherein the determining the existing SLRB configuration is required for the second RRC PC5 communication link comprises determining that the existing configuration is based on a source layer 2 identifier (L2ID) and a SL logical channel identifier (LCID) identified by the request.

3. The method of claim 1, wherein the determining the existing SLRB configuration is required for the second RRC PC5 communication link comprises determining a MAC header of a request message received from the source UE device includes an indication that the first PC5 RRC communication link has been released by the source UE device.

4. The method of claim 1, further comprising establishing the second PC5 RRC SL communication link after releasing the first RRC PC5 SL communication link.

5. The method of claim 1, further comprising:
    after releasing the first RRC PC5 communication link, informing an upper layer protocol function of the release through an access stratum (AS) functional layer of the peer UE device.

6. The method of claim 1, wherein the request is transmitted from the source UE device in response to the source UE device releasing the first RRC PC5 communication link.

7. The method of claim 6, wherein the source UE device determines to release the first RRC PC5 communication link based on a number of Radio Link Control (RLC) retransmissions.

8. The method of claim 6, wherein the request is transmitted from the source UE device after expiration of timer.

9. The method of claim 8, wherein the timer is based on a time interval between keep-alive messages received from the peer UE device over the first RRC PC5 communication link.

10. The method of claim 9, wherein the timer is an autonomous timer derived at the source UE device based on observation of the time interval between keep-alive messages received from the peer UE device over the first RRC PC5 communication link.

11. The method of claim 9, wherein the time interval is communicated between the peer UE device and the source UE device over the first RRC PC5 communication link.

12. The method of claim 1, further comprising:
receiving information from a base station; and
determining to release the first RRC PC5 communication in response to the information.

13. The method of claim 12, wherein the information received from the base station indicates that the source UE device has released the first RRC PC5 communication link.

14. The method of claim 1, further comprising:
maintaining a plurality of RRC PC5 communication links with the source UE device, the plurality of RRC PC5 communication links comprising the first RRC PC5 communication link.

15. A peer user equipment (UE) device comprising:
a transceiver configured to maintain a first unicast PC5 Radio Resource Control (RRC) communication link with a source UE device, the first unicast PC5 RRC communication link having an existing Sidelink Radio Bearer (SLRB) configuration,
the transceiver comprising a receiver configured to receive a request to establish a second unicast PC5 RRC communication link with the source UE device; and
a controller configured to determine that the existing SLRB configuration is required to support the second unicast PC5 RRC communication link and to
release the first unicast PC5 RRC communication link.

16. The peer UE device of claim 15, wherein the controller is configured to determine that the existing SLRB configuration is required for the second RRC PC5 communication link by at least determining that the existing configuration is based on a source layer 2 identifier (L2ID) and a SL logical channel identifier (LCID) identified by the request.

17. The peer UE device of claim 15, wherein the controller is further configured to establish the second PC5 RRC communication link after releasing the first RRC PC5 communication link.

18. The peer UE device of claim 15, the controller further configured to, after releasing the first RRC PC5 communication link, inform an upper layer protocol function of the release through an access stratum (AS) functional layer of the peer UE device.

19. The peer UE device of claim 15, wherein the request is transmitted from the source UE device in response to the source UE device releasing the first RRC PC5 communication link.

20. The peer UE device of claim 19, wherein the source UE device determines to release the first RRC PC5 communication link based on a number of Radio Link Control (RLC) retransmissions.

21. The peer UE device of claim 19, wherein the request is transmitted from the source UE device after expiration of timer.

22. The peer UE device of claim 21, wherein the timer is based on a time interval between keep-alive messages received from the peer UE device over the first RRC PC5 communication link.

23. The peer UE device of claim 22, wherein the timer is an autonomous timer derived at the source UE device based on observation of the time interval between keep-alive messages received from the peer UE device over the first RRC PC5 communication link.

24. The peer UE device of claim 22, wherein the time interval is communicated between the peer UE device and the source UE device over the first RRC PC5 communication link.

25. The peer UE device of claim 15, wherein the receiver is configured to receive information from a base station and the controller is configured to release the first RRC PC5 communication in response to the information.

26. The peer UE device of claim 25, wherein the information received from the base station indicates that the source UE device has released the first RRC PC5 communication link.

27. The peer UE device of claim 15, wherein the transceiver is configured to maintain a plurality of RRC PC5 communication links with the source UE device, the plurality of RRC PC5 communication links comprising the first RRC PC5 communication link.

* * * * *